United States Patent
Cappelle et al.

(10) Patent No.: US 11,406,116 B2
(45) Date of Patent: Aug. 9, 2022

(54) EDIBLE CHOCOLATE PRODUCT

(71) Applicant: PURATOS NV, Groot-Bijgaarden (BE)

(72) Inventors: Stefan Cappelle, Onkerzele (BE); Julien Simonis, Brussels (BE)

(73) Assignee: PURATOS NV, Groot-Bugaarden (BE)

( * ) Notice: Subject to any disclaimer, the term of this patent is extended or adjusted under 35 U.S.C. 154(b) by 108 days.

(21) Appl. No.: 16/609,359

(22) PCT Filed: May 9, 2018

(86) PCT No.: PCT/EP2018/061964
§ 371 (c)(1),
(2) Date: Oct. 29, 2019

(87) PCT Pub. No.: WO2018/206622
PCT Pub. Date: Nov. 15, 2018

(65) Prior Publication Data
US 2020/0187520 A1    Jun. 18, 2020

(30) Foreign Application Priority Data

May 11, 2017    (BE) .................................. 2017/5349

(51) Int. Cl.
*A23G 1/48*    (2006.01)
*A23G 1/42*    (2006.01)

(52) U.S. Cl.
CPC ............. *A23G 1/48* (2013.01); *A23G 1/423* (2013.01)

(58) Field of Classification Search
CPC ............. A23G 1/30; A23G 1/48; A23G 1/423
USPC ....................................................... 426/631
See application file for complete search history.

(56) References Cited

U.S. PATENT DOCUMENTS

| | | | |
|---|---|---|---|
| 4,294,864 A | 10/1981 | Kulp | |
| 2006/0222753 A1 | 10/2006 | Harshburger | |
| 2007/0292577 A1 | 12/2007 | Kopp et al. | |
| 2011/0059224 A1 | 3/2011 | Harrison | |
| 2016/0143312 A1* | 5/2016 | Chandrasekaran | ...... A23G 1/44 426/611 |

FOREIGN PATENT DOCUMENTS

| | | |
|---|---|---|
| CL | 200202485 | 10/2002 |
| CN | 106509292 A | 3/2017 |
| DE | 20017502 U1 | 3/2001 |
| DE | 10329226 A1 | 8/2004 |
| GB | 2452972 A | 3/2009 |
| JP | H06-197678 A | 7/1994 |
| KR | 20060112878 A * | 11/2006 |
| KR | 20060112878 A | 11/2006 |
| KR | 20110029611 A | 3/2011 |
| RU | 2588164 C1 | 6/2016 |
| RU | 2606822 C1 | 1/2017 |
| WO | WO 2003/037100 A1 | 5/2003 |
| WO | WO 2006000065 A1 | 1/2006 |
| WO | WO 2013029193 A1 | 3/2013 |
| WO | WO 2013091121 A1 | 6/2013 |

OTHER PUBLICATIONS

Lees "Sugar confectionery and Chocolate manufacture", Published 1974, Leonard Hill books, pp. 122, 133-139 (Year: 1974).*
PCT International Search Report and Writtem Opinion for PCT Internationa Patent Application No. PCT/EP2018/061964, dated Jul. 9, 2018.
Pump Street Bakery, "Sourdough and sea salt chocolate", obtained from URL: <http://www.pumpstreetbakery.com/product/sourdough-sea-salt-66>.
Pump Street Bakery, Sourdough Sea Salt Homemade Chocolate from Oxford, Suffolk at Chocolate Week London, <https://www.sergetheconcierge.com/2014/10/pump-street-bakery-sourdough-sea-salt-handmade-chocolate-from-orford-suffolk-at-chocolate-week-london.html>, published on Oct. 11, 2014.
Sourdough Chocolate Bars, <http://www.farine-mc.com/2012/10/sourdough-chocolate-bars.html>, published on Oct. 23, 2012.
Search Report for Russian Patent Application No. 2019139815, dated Sep. 13, 2021.
Lees et al., Sugar confectionery and chocolate manufacture, 1973, Chapters 8.9-8.10, pp. 133-139.

* cited by examiner

*Primary Examiner* — Jyoti Chawla
(74) *Attorney, Agent, or Firm* — Lathrop GPM LLP; James H. Velema; Judith L. Stone-Hulslander

(57) ABSTRACT

Edible chocolate products are provided. They comprise chocolate and a dry powdered fermented plant product. The dry powdered fermented plant product may be a sourdough. The edible chocolate product may be either liquid or solid. Preferably, it is solid. It may be used as food, or as an ingredient in foods.

20 Claims, No Drawings

EDIBLE CHOCOLATE PRODUCT

CROSS-REFERENCE TO RELATED APPLICATIONS

This application is a 35 U.S.C. § 371 filing of International Patent Application No. PCT/EP2018/061964, filed May 9, 2018, which claims priority to Belgium Patent Application No. 2017/5349, filed May 11, 2017, the entire contents of which are incorporated herein by reference.

FIELD OF THE INVENTION

The present invention belongs to the technical field of food processing. More specifically, the present invention relates to edible chocolate products, to cocoa based products, and to a method for producing such products.

BACKGROUND

Chocolate and cocoa are amongst the most popular food types and flavours in the world. Chocolate has been combined for a long time with different flavours and with other different food ingredients in order to create new tastes or taste combinations in response to the unlimited variety of consumer inclinations. Many types of chocolate containing aromas or extracts exist on the market. For example mint chocolate, chocolate with fruit extracts, chocolate with fruit pieces, chocolate with patisserie products pieces (e.g. chocolate with cookie pieces), chocolate filled with different fillings (chocolate or fruit mousses, liquors, . . . ).

There are many different ways of consuming chocolate or chocolate derivatives, the most common one being the consumption of the chocolate as the unique or the main ingredient of the food item (chocolate bars, pralines, etc.). Among other applications is the use of chocolate in bakery and patisserie items to enhance consumer attractiveness. Classical examples of this include chocolate croissants, chocolate rolls, chocolate muffins, chocolate cookies, etc.

Fermentation is a common practice in the processing of food to improve qualities such as extended shelf-life and organoleptic properties. Food may be fermented by a wide variety of diverse microorganisms, which include mycelial molds, yeasts and bacteria, mostly lactic acid bacteria, bacilli, and micrococci. Fermented foods include foods from animal and plant origins. Among these latter are cereals, pseudo-cereals, pulses and tubers that give products as diverse as Sauerkraut, Kimchi, Natto, Tempe, Miso, Pozol or Sourdough.

Sourdoughs have been used since ancient times in bread/bakery products making, and one of their functions is to impart flavour to the product in which they are used. Sourdoughs are generally obtained by the fermentation of flour with lactic acid bacteria and eventually yeast. Depending on the type of raw materials, on the choice of species of microorganisms and on the processing conditions a great variety of sourdoughs may be obtained. These sourdoughs may have a wide variety of technological, sensorial or aromatic/flavouring properties. Sourdoughs may be found in different forms such as liquid forms, paste forms or solid (dried) forms and may contain living or dead microorganisms. Most commonly, sourdoughs are used in baking. They are dosed on top of the flour up to 20% dependent on the level of taste intensity required in the application.

The combination of sourdough and chocolate has already been used in bakery products. However, the amount of chocolate in the existing products is low, for example lower than 10%, lower than 5%, or lower than 1%, and therefore this is not regarded as a chocolate product.

Sourdoughs are not intended to be consumed as such and are usually not consumed as such. Indeed their organoleptic properties render them particularly unsuitable for direct consumption.

In the moving world of today, consumers are constantly looking for new tastes and new sensations.

SUMMARY OF THE INVENTION

The present disclosure relates to edible chocolate products comprising chocolate and a dry powdered fermented plant product. The edible chocolate product may be either liquid or solid, though preferably, it is solid.

In a first aspect the edible chocolate product as disclosed herein comprises
- between 50.0 and 99.0% (w/w) chocolate, preferably between 85.0 and 95.0% (w/w) chocolate; and
- between 1.0 and 50.0% (w/w) of a dry powdered fermented plant product, preferably between 5.0 and 15.0% (w/w) of dry powdered fermented plant product preferably wherein said dry powdered fermented plant product is either
  i) a fermented flour; or
  ii) a flour derived from fermented cereals, pseudo-cereals, seeds, pulses, tubers, fractions of cereals, fractions of pseudo-cereals, fractions of seeds, fractions of pulses, fractions of tubers or combinations thereof.

In a particular embodiment, the edible chocolate product as disclosed herein comprises
- between 50.0 and 99.0% (w/w) chocolate, preferably between 85.0 and 95.0% (w/w) chocolate; and
- between 1.0 and 50.0% (w/w) of a dry powdered fermented plant product, preferably between 5.0 and 15.0% (w/w) of dry powdered fermented plant product; wherein said dry powdered fermented plant product is either
  i) a fermented flour; or
  ii) a flour derived from fermented cereals, pseudo-cereals, fractions of cereals, fractions of pseudo-cereals, or combinations thereof.

In a particular embodiment, the edible chocolate product as disclosed herein provides that the sum of said chocolate content and said dry powdered fermented plant product content is higher than 80% (w/w), preferably higher than 90% (w/w), more preferably higher than 95% (w/w).

In a particular embodiment, the edible chocolate product as disclosed herein is characterized by having a dry matter content higher than 80%, preferably higher than 85%, more preferably higher than 90%.

In a particular embodiment, the edible chocolate product as disclosed herein is characterized by having a granulometry below 30.0 µm.

In a particular embodiment, the edible chocolate product as disclosed herein is characterized in that said chocolate is a refined and/or conched chocolate.

In a particular embodiment, the edible chocolate product as disclosed herein is characterized in that said dry powdered fermented plant product is a sourdough product.

A further aspect as disclosed herein provides in a method for preparing an edible chocolate product as disclosed herein comprising the steps:
a1) mixing a dry powdered fermented plant product and molten chocolate, thereby obtaining a chocolate-fermented plant product mixture; or, a2) melting chocolate ingredients including cocoa mass, fat, and optionally one or more further ingredients, thereby obtaining molten chocolate ingredients; and further mixing the molten chocolate ingredients with a dry powdered fermented plant product, thereby obtaining a chocolate ingredients-fermented plant product mixture;

the method further comprising the step of:

b) further processing the chocolate-fermented plant product mixture or the chocolate ingredients-fermented plant product mixture into an edible chocolate product.

In a particular embodiment, the method as disclosed herein comprises the steps:

a1) mixing a dry powdered fermented plant product and molten chocolate, thereby obtaining a chocolate-fermented plant product mixture; or, a2) melting chocolate ingredients including cocoa mass, fat, and optionally one or more further ingredients, thereby obtaining molten chocolate ingredients; and further mixing the molten chocolate ingredients with a dry powdered fermented plant product, thereby obtaining a chocolate ingredients-fermented plant product mixture;

wherein said dry powdered fermented plant product is either
  i) a fermented flour; or
  ii) a flour derived from fermented cereals, pseudo-cereals, fractions of cereals, fractions of pseudo-cereals, or combinations thereof;

the method further comprising the step of:

b) further processing the chocolate-fermented plant product mixture or the chocolate ingredients-fermented plant product mixture into an edible chocolate product.

In a particular embodiment, the method as disclosed herein further provides that the step of further processing the chocolate-fermented plant product mixture into an edible chocolate product comprises the steps of:
  1) tempering the chocolate-fermented plant product mixture, thereby obtaining a tempered mixture; and,
  2) cooling the tempered mixture.

In a particular embodiment, the method as disclosed herein further provides that the step of further processing the cocoa butter-fermented plant product mixture into an edible chocolate product comprises the steps of:
  1) refining the cocoa butter-fermented plant product mixture, thereby obtaining a refined mixture;
  2) optionally conching the refined mixture, thereby obtaining a conched mixture;
  3) adding further ingredients to the refined or conched mixture, thereby liquefying the refined or conched mixture, thus obtaining a liquefied mixture;
  4) tempering the liquefied mixture, thereby obtaining tempered chocolate.

In a particular embodiment, the method as disclosed herein further provides that said further ingredients may comprise sugar, all or part of the cocoa mass, all other solid ingredients like milk powders and/or substitutes thereof, flavours and emulsifiers.

In a particular embodiment, the method as disclosed herein further provides that steps a1) and a2) are performed at a temperature between 40.0° C. and 50.0° C., preferably at 45.0° C.

In a particular embodiment, the method as disclosed herein further provides that the refining process (of step b1)) is executed until a particle size below 30 μm is achieved.

In a particular embodiment, the method as disclosed herein further provides that the conching process (of step (b2)) is done for 3 h to 6 h at 55° C. to 90° C.; and/or at a motor speed of 375 rpm to 750 rpm.

A further aspect as disclosed herein provides in the use of a dry powdered fermented plant product for producing an edible non-baked chocolate product as disclosed herein; the dry powdered fermented plant product being either
  i) a fermented flour; or
  ii) a flour derived from fermented cereals, pseudo-cereals, seeds, pulses, tubers, fractions of cereals, fractions of pseudo-cereals, fractions of seeds, fractions of pulses, fractions of tubers or combinations thereof.

In a particular embodiment, the use as disclosed herein provides that the dry powdered fermented plant product being either
  i) a fermented flour; or
  ii) a flour derived from fermented cereals, pseudo-cereals, fractions of cereals, fractions of pseudo-cereals, or combinations thereof.

In a particular embodiment, the use as disclosed herein provides that the dry powdered fermented plant product is a sourdough product.

A further aspect as disclosed herein provides in the use of a dry powdered fermented plant product as a complete or partial replacer for one or more ingredients in a chocolate recipe, wherein said ingredients are chosen from sugar, milk and/or milk powder. In particular, said dry powdered fermented plant product is used to replace all the milk and/or the milk powder in a chocolate recipe.

DETAILED DESCRIPTION

The present invention will be described with respect to particular embodiments but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present disclosure relates to edible chocolate products comprising chocolate and a dry powdered fermented plant product. The edible chocolate product may be either liquid or solid, though preferably, it is solid.

The edible chocolate product provided herein may be consumed as such. In addition, the edible chocolate product may be used as an ingredient in various foods, and typically in foods in which chocolate is classically used as an ingredient. The edible chocolate product may be particularly used as a partial or whole substitute for chocolate in these foods. When the edible chocolate product is used in these foods, it provides an unexpected taste and aroma. Examples of foods in which the present edible chocolate products may be used include cakes, brownies, brioches, panettone, filled buns, chocolate rolls, and pralines.

Furthermore, the present edible chocolate product is useful in conjunction with, or as a whole or partial replacement of dry powdered fermented plant products in various foods which commonly comprise a dry powdered fermented plant product.

The edible chocolate product may also be used in foods which normally comprise neither chocolate nor dry powdered fermented plant products. Examples include savoury gastronomy.

Non-limiting example of uses of the present edible chocolate products are:
- chocolate and confectionery applications including chocolate bars, chocolate barks, and pralines;
- bakery applications including brioches, filled buns, panettone, and croissants; and,
- patisserie applications such as including cakes, chocolate cakes, brownies, cookies, cereal bars, and Danish pastries.

Accordingly, provided herein is an edible chocolate product comprising chocolate and a dry powdered fermented plant product, preferably comprising between 50.0 and 99.0% (w/w) chocolate; and between 1.0 and 50.0% (w/w) of a dry powdered fermented plant product. More preferably, the edible chocolate product comprises between 65.0 and 99% (w/w) chocolate and between 1.0 and 35.0% (w/w) of a dry powdered fermented plant product. Even more preferably, the edible chocolate product comprises between 70.0 and 95.0% (w/w) chocolate and between 5.0 and 30.0% (w/w) of said dry powdered fermented plant product. Even more preferably, the edible chocolate product comprises between 75.0 and 95.0% (w/w) chocolate and between 5.0 and 25.0% (w/w) of said dry powdered fermented plant product. Even more preferably, the edible chocolate product comprises between 85.0 and 95.0% (w/w) chocolate and between 5.0 and 15.0% (w/w) of said dry powdered fermented plant product. Such edible chocolate products have unexpected tastes which go above and beyond the tastes of the constituent ingredients.

Preferably, the dry powdered fermented plant product is either i) a fermented flour; or ii) a flour derived from fermented cereals, pseudo-cereals, seeds, pulses, tubers, fractions of cereals, fractions of pseudo-cereals, fractions of seeds, fractions of pulses, fractions of tubers or combinations thereof, wherein the seeds are preferably not cocoa beans. More preferably, the dry powdered fermented plant product is either i) a fermented flour; or ii) a flour derived from fermented cereals, pseudo-cereals, fractions of cereals, fractions of pseudo-cereals, or combinations thereof.

In particular embodiments, the dry powdered fermented plant product is a plant or a plant fraction that has been fermented by microorganisms, then dried and eventually milled to give a powdered product. Preferably the microorganisms used for the fermentation are chosen from bacteria and/or yeast, more preferably lactic acid bacteria and yeast. Alternatively, other microorganisms known in the art of fermentation may be used. The plant or the plant fraction originates from cereals, pseudo-cereals, pulses or tubers, preferably cereals or pseudo-cereals. Examples of cereals are wheat, rye, durum wheat, rice, barley, millet, kamut, emmer, einkorn, spelt or chia. Examples of pseudo-cereals are buckwheat or quinoa. Examples of pulses are peas or chickpeas. Examples of tubers are potato, sweet potato, yam, cassava or canna tubers.

The edible chocolate products provided herein have a very distinct taste, and should be contrasted with existing products featuring combinations of powdered fermented plant product-containing bakery products and chocolate. Examples of such existing products are sourdough-and-chocolate containing products such as Pumpstreet Bakery "Sea Salt and Sourdough". The sourdough in such products is sourdough bread, which imparts mainly texture and bread taste to the chocolate. Accordingly it can be seen as a "bread" which is enrobed by chocolate, which imparts a certain texture and flavour experience when eaten. Conversely, in the edible chocolate products disclosed herein, the dry powdered fermented plant product is dispersed as particles throughout a chocolate matrix.

In particular embodiments, the dry powdered fermented plant product has a dry matter content higher than or equal to 86%, preferably higher than or equal to 90%, more preferably higher than or equal to 94%.

In particular embodiments, the dry powdered fermented plant product has a granulometry lower than 500 µm, preferably lower than 300 µm, more preferably lower than 200 µm. When referring to the properties of a dry powdered fermented plant product, the expression "a granulometry lower than X µm" indicates that at least 90% (w/w), preferably at least 95% (w/w) of the particles in the dry powdered fermented plant product have a size lower than X µm. The concept "size of a particle" as used herein refers to the particle size measured by means of sieve analysis.

In particular embodiments, the edible chocolate product is non-baked.

Preferably, the edible chocolate product is a homogeneous mixture of chocolate and the dry powdered fermented plant product. In other words, the dry powdered fermented plant product is preferably evenly distributed throughout the edible chocolate product, and the edible chocolate product is free, or at least substantially free of agglomerates, pockets, or inclusions of pure or substantially pure dry powdered fermented plant product.

In particular embodiments, the edible chocolate product only comprises one type of dry powdered fermented plant product. However, in some embodiments, the edible chocolate product comprises more than one type of dry powdered fermented plant product.

In particular embodiments, the dry powdered fermented plant product comprises one or more further ingredients selected from the list comprising malt and sprouted grain flour.

The weight percentages used herein express the concentration of a component based on the total weight of the chocolate product. In other words, when the concentration of component A is xx % (w/w), then xx=(weight of component A)/(weight of chocolate product)*100.

In the context of the present invention the term "chocolate" refers to chocolate as described in the EC directive 2000/36/EC of the European Parliament and the Council, which relates to cocoa and chocolate products intended for human consumption (directive of 23 Jun. 2000) or to chocolate analogues well known in the art. The term "chocolate" as used herein includes chocolate analogues.

Chocolate analogues are dark, milk or white chocolate products that can be hard, soft or liquid. They contain a fat phase composed of vegetable fats and a dry phase containing sugar and/or sugar substitutes. They can comprise milk powders or milk powders replacers, cocoa powders or cocoa powder replacers, emulsifiers, and/or various flavours. They can also contain sugar substitutes as a partial or whole replacement for sugar. These chocolate analogues are used in a wide variety of applications, ranging from moulded products to fillings for patisserie products, from inclusions for bakery to flavouring of doughs.

Non limiting examples of chocolate analogues are
Dark, milk and white hard compound chocolates
Dark, milk and white soft compound chocolates
Dark, milk and white cocoa-based fat fillings For dark chocolate analogue, the cocoa solids content is preferably equal or higher than 4%; more preferably higher than 9%, even more preferably higher than 14%.

In a preferred embodiment the chocolate product is "real chocolate". By "real chocolate" is meant a chocolate such as dark chocolate, milk chocolate, household chocolate and/or white chocolate (corresponding to the definitions given in EC directive 2000/36/EC of the European Parliament and the Council, which relates to cocoa and chocolate products intended for human consumption (directive of 23 Jun. 2000). In these chocolates, cocoa butter may be replaced by maximum 5% of cocoa butter equivalents.

Cocoa butter equivalents are defined as fat compositions having a solid fat content measured at 30° C. with IUPAC method 2.150 a, the fat composition not being subjected to a thermal treatment, that differs at least 8% absolute from the solid fat content measured at the same temperature with IUPAC method 2.150b, the fat composition this time being subjected to a thermal treatment program described in that method.

Non-limiting examples of real chocolates are:
Dark chocolate or plain chocolate, i.e. products consisting of a mixture of cocoa products and sugars and/or sweeteners, preferably sugar, containing not less than 35% total dry cocoa solids, including not less than 18% cocoa butter and not less than 14% of dry non-fat cocoa solids. Where this name ((dark) chocolate) is supplemented by the word "couverture", the product must contain not less than 35% total dry cocoa solids, including not less than 31% cocoa butter and not less than 2.5% of dry non-fat cocoa solids.

"Milk chocolate", i.e. a product obtained from cocoa products, sugars and/or sweeteners, preferably sugar, and milk or milk products, which contains not less than 25% total dry cocoa solids; not less than 14% dry milk solids obtained by partly or wholly dehydrating whole milk, semi- or full-skimmed milk, cream, or from partly or wholly dehydrated cream, butter or milk fat; not less than 2.5% dry non-fat cocoa solids; not less than 3.5% milk fat; and not less than 25% total fat (cocoa butter and milk fat). Where this name (milk chocolate) is supplemented by the word "couverture" the product must have a minimum total fat (cocoa butter and milk fat) content of 31%.

"Family milk chocolate", i.e. a product obtained from cocoa products, sugars and/or sweeteners, preferably sugar, and milk or milk products containing not less than 20% total dry solids; not less than 20% dry milk solids obtained by partly or wholly dehydrating whole milk, semi- or full-skimmed milk, cream, or from partly or wholly dehydrated cream, butter or milk fat; not less than 2.5% dry non-fat cocoa solids; not less than 5% milk fat; and not less than 25% total fat (cocoa butter and milk fat).

Another example of a real chocolate is white chocolate. The term "White chocolate" designates a product obtained from cocoa butter, milk or milk products and sugars which contains not less than 20% cocoa butter and not less than 14% dry milk solids obtained by partly or wholly dehydrating whole milk, semi- or full-skimmed milk, cream, or from partly or wholly dehydrated cream, butter or milk fat, of which not less than 3.5% is milk fat. Optional ingredients such as nuts, lecithin, whey powder, etc. may be added to any of the above types of chocolate.

In some embodiments the "real chocolate" is a tempered "real chocolate".

In some embodiments, the chocolate is chocolate comprising dry cocoa solids, preferably at least 20% dry cocoa solids. In some embodiments, the chocolate is not white chocolate.

In some embodiments the dry powdered fermented plant product may replace part or all of one or more regular ingredient(s) of a chocolate. Particularly the dry powdered fermented plant product may replace part or all of the sugar and/or the milk in a chocolate recipe. More particularly the dry fermented plant product replaces all the milk in a chocolate recipe.

In particular embodiments, the sum of said chocolate content and said dry powdered fermented plant product content is higher than 80% (w/w). Preferably, the sum of said chocolate content and said dry powdered fermented plant product content is higher than 90% (w/w). More preferably, the sum of said chocolate content and dry powdered fermented plant product content is higher than 95% (w/w).

In particular embodiments, the edible chocolate product's dry matter content is higher than 80%. Preferably, the edible chocolate product's dry matter content is higher than 85%. More preferably, the edible chocolate product's dry matter content is higher than 90%.

In particular embodiments, the edible chocolate product has a granulometry below 30.0 µm. Preferably, the edible chocolate product has a granulometry below 25.0 µm. More preferably, the edible chocolate product has a granulometry below 22.0 µm. This provides a good mouth feel and good organoleptic properties.

When used in the context of edible chocolate products, the term "granulometry" refers to the concept of grain size, and it may be measured by melting an edible chocolate product and measuring the particle size by using, for example, a set of sieves of know mesh size, a laser diffraction particle size analyser or a micrometer. When a product has a granulometry of a specific value, at least 97% of the particles in that product have a grain size below that specific value.

In particular embodiments, said chocolate is a refined and/or conched chocolate. This enhances the organoleptic properties of the edible chocolate product. In particular embodiments, said edible chocolate product comprises a refined and/or conched mixture of chocolate and dry powdered fermented plant product.

In particular embodiments, the dry powdered fermented plant product is a sourdough product. A sourdough product is a product obtained from first fermenting a dough by lactic acid bacteria, then fermenting the dough with yeast, an finally drying the fermented dough. The fermentation, and possibly the drying, gives to the sourdough product a characteristic acidic flavour due to the lactic acid bacteria producing mainly lactic acid, acetic acid and some minor compounds. In addition, sourdough products also feature typical flavour top-notes produced by the yeast. Sourdoughs provide a rich taste and nose to edible chocolate products containing them.

As mentioned before, the present edible chocolate products comprise chocolate and a dry powdered fermented plant product. Two distinct paths for producing the edible chocolate products are disclosed. The first path involves a method which starts from chocolate and a dry powdered fermented plant product. The second method starts from chocolate ingredients and a dry powdered fermented plant product. Both methods give rise to a similar product in the sense that the end product of both methods is an edible chocolate product comprising chocolate and the dry powdered fermented plant product. It will be understood that in the method starting from chocolate ingredients and a dry powdered fermented plant product, the chocolate ingredients are transformed into chocolate during execution of the method, thus resulting in an edible chocolate product comprising a dry powdered fermented plant product. We first discuss how an edible chocolate product might be manufactured starting from chocolate and a dry powdered fermented plant product. In particular, provided herein is a method for preparing an edible chocolate product. The method comprises the steps: mixing a dry powdered fermented plant product and chocolate, thereby obtaining a chocolate-fermented plant product mixture (step a1); and further processing the chocolate-fermented plant product mixture into an edible chocolate product (step b). The method allows obtaining an edible chocolate product having a great taste and mouthfeel from chocolate and a dry powdered fermented plant product.

Preferably, the chocolate is molten prior to mixing with the dry powdered fermented plant product. This enhances the homogeneity of the resulting mixture. The melting temperature of the chocolate depends on the specific chocolate used, and is either a well-known parameter to the skilled person, or a parameter which can be obtained by routine experimentation.

Alternatively, the edible chocolate product may be manufactured starting from chocolate ingredients and a dry powdered fermented plant product. Accordingly, provided is an alternative method for preparing an edible chocolate product. The method comprises the steps: melting chocolate ingredients including cocoa mass, fat, and optionally one or more further ingredients, thereby obtaining molten chocolate ingredients. This is followed by the step of mixing the molten chocolate ingredients with a dry powdered fermented plant product, thereby obtaining a chocolate ingredients-fermented plant product mixture (step a2); and the method further comprising the step of: further processing the chocolate ingredients-fermented plant product mixture into an edible chocolate product (step b). The method allows obtaining an edible chocolate product having a great taste and mouthfeel from chocolate ingredients and a dry powdered fermented plant product.

In particular embodiments, the fat comprises cocoa butter and/or substitutes thereof. Suitable substitutes for cocoa butter include palm oil and palm-kernel oil-based substitutes, coconut oil-based substitutes, soybean oil, rapeseed oil, cottonseed oil, shea oil, illipe oil, and sal nut oil, palm oil, mango kernel fat oil, and palm oil.

The mixing step in the above methods may be performed by means of any mixer. Suitable mixers include batch mixers, batch vertical mixers, batch horizontal mixers, continuous mixers. The mixing step may also be performed manually. For example, the mixer may be a kitchen robot, a Hobart mixer, or a Stephan mixer. Preferably, the mixer has temperature control.

In particular embodiments, the step of further processing the chocolate-fermented plant product mixture into an edible chocolate product comprises the steps of:

1) tempering the chocolate-fermented plant product mixture, thereby obtaining a tempered mixture; and,
2) cooling the tempered mixture.

This results in an edible chocolate product having a uniform sheen and a crisp bite. In particular embodiments, the step of further processing the chocolate ingredients-fermented plant product mixture into an edible chocolate product comprises the step of refining the chocolate ingredients-fermented plant product mixture, thereby obtaining a refined mixture.

During the refining step, the particle size of the mixture's ingredients is reduced and homogenized, i.e. after refining, the mixture has a unimodal particle size distribution. Also, the temperature of the mixture generally increases during refining.

Advantageously the particle size is below 30 µm, preferably between 15 and 25 µm, and even more preferably between 18 to 22 µm.

Refining may be done using different types of processes or tools. Suitable tools are 3 or 5-rolls refiner, ball mill, or refiner-conche such as the MacIntyre's Universal Refiner/Conche.

The refining step results in enhanced taste and better mouthfeel.

Preferably, the refined mixture is then conched, thus obtaining a conched mixture.

During the conching process, shear and heat are applied. The main effects are 1) modification of rheological properties, 2) development of flavour, and 3) effect on the particle size homogeneity. The conching process results in the decrease of the viscosity and the yield value. At the end of the conching step, the chocolate has developed the right flavour and the desired rheological properties.

Optionally, further ingredients are added to the refined or conched mixture. In particular embodiments, the one or more further ingredients comprise sugar, solid ingredients such as milk powder and/or substitutes thereof, flavouring agents, and/or emulsifiers. Specific examples are provided below, in the section "examples". Guided by these examples, the skilled person can easily determine the quantities of each ingredient to be added.

In a further step, the refined or conched mixture is liquefied, and a liquefied mixture is obtained as a result.

In particular embodiments, the refined or conched mixture is liquefied by adding a melted fat phase and/or emulsifiers. Optionally, the steps of "adding further ingredients" and "liquefying the conched or refined mixture" are executed simultaneously.

Preferably, the melted fat phase which is added in this step is already present in the conched or refined mixture. Preferably, the melted fat phase is preferably melted cocoa butter and/or alternatives therefor.

Preferably, the emulsifiers are lecithin, polyglycerol polycrinoleate (PGPR), and/or sodium tristearate (STS).

Preferably, and particularly when a solid edible chocolate product is desired, the liquefied mixture is tempered, thus obtaining a tempered mixture. During the tempering step, the liquefied mixture is cooled and solidified, thus resulting in a solid edible chocolate product. The tempering step results in an optimum crystallization of its fat phase. Inter alia based on the guidance provided in the examples of the present disclosure, the skilled person will adapt the tempering process according to the specific solid edible chocolate product which is produced. When the solid edible chocolate product is manufactured starting from chocolate and a dry powdered fermented plant product, the recommendations provided for tempering that particular chocolate may be followed.

In particular embodiments, said further ingredients may comprise sugar, all or part of the cocoa mass, all other solid ingredients like milk powders and/or substitutes thereof, flavours and emulsifiers. This allows obtaining edible chocolate products with a large variety of tastes and textures. The emulsifiers may be all emulsifiers which are comprised in the final edible chocolate product, or they may be part of the emulsifiers which are comprised in the final edible chocolate product.

In particular embodiments, steps a1) and a2) are performed at a temperature between 40.0° C. and 50.0° C., preferably at 45.0° C.

In particular embodiments, the refining process of step b3) is executed until a particle size under 30 μm is achieved, more preferably around 20 μm. This results in excellent organoleptic properties of the resulting edible chocolate product.

In particular embodiments, the conching process of step (2) is done for 3 h to 6 h at 55° C. to 90° C.; and/or at a motor speed of 375 rpm to 750 rpm. This results in excellent organoleptic properties of the resulting edible chocolate product.

Further provided is the use of a dry powdered fermented plant product for producing an edible non-baked chocolate product provided herein; the dry powdered fermented plant product being either
  i) a fermented flour or a roasted flour; or
  ii) a flour derived from sprouted, malted, extracted, fermented, dried, roasted, toasted, or puffed cereals, pseudo-cereals, seeds, pulses, tubers, fractions of cereals, fractions of pseudo-cereals, fractions of seeds, fractions of pulses, fractions of tubers or combinations thereof, preferably a flour derived from sprouted, malted, extracted, fermented, dried, roasted, toasted, or puffed cereals, pseudo-cereals, fractions of cereals, fractions of pseudo-cereals, or combinations thereof.

This results in excellent organoleptic properties of the resulting edible chocolate product.

In particular embodiments, the dry powdered fermented plant product is a sourdough product. This results in excellent organoleptic properties of the resulting edible chocolate product.

In a further aspect the invention provides a method to replace one or more ingredient(s) of a regular chocolate by a dry powdered fermented plant product. The inventors have surprisingly found that it was possible to replace part or all of some ingredients of a chocolate recipe while still obtaining an edible chocolate product with excellent organoleptic properties. Preferably the dry powdered fermented plant product replaces part or all of the sugar, the milk and/or the milk powder. More preferably the dry powdered fermented plant product replaces part or all of the milk and/or the milk powder. Even more preferably the dry fermented plant product replaces all the milk and/or the milk powder. In specific embodiments the dry powdered fermented product used to replace chocolate ingredient(s) as described above, preferably milk and/or milk powder is a dried sourdough.

EXAMPLES

Example 1

In a first example, two types of edible chocolate products according to the present invention are discussed.

The first type of edible chocolate products comprise a plurality of chocolate ingredients, and a dry powdered fermented plant product. These chocolate products and their compositions are listed in table 1.

The second type of edible chocolate products contain chocolate and a dry powdered fermented plant product. These edible chocolate products are listed in table 2. The ingredients of the edible chocolate products and their respective amounts are listed in table 1. As dry powdered fermented plant products, three powdered sourdoughs from Puratos (Belgium) used were used: Tosca, Oberto, and Traviata.

TABLE 1

The weight in g of the ingredients of various chocolates (white, dark, and milk) and edible chocolate products (1-5).

| g | White | Dark | Milk | 1 | 2 | 3 | 4 | 5 |
|---|---|---|---|---|---|---|---|---|
| Sugar | 1950 | 1900 | 2072 | 1950 | 1900 | 2072 | 2072 | 2072 |
| Cocoa mass | 0 | 1825 | 572 | 0 | 1825 | 572 | 572 | 572 |
| Cocoa butter | 1274 | 500 | 1250 | 1274 | 500 | 1250 | 1250 | 1250 |

TABLE 1-continued

The weight in g of the ingredients of various chocolates (white, dark, and milk) and edible chocolate products (1-5).

| g | White | Dark | Milk | 1 | 2 | 3 | 4 | 5 |
|---|---|---|---|---|---|---|---|---|
| Cocoa powder | 0 | 100 | 0 | 0 | 100 | 0 | 0 | 0 |
| Milk powder | 1100 | 0 | 1080 | 1100 | 0 | 0 | 0 | 0 |
| Tosca | 0 | 0 | 0 | 650 | 0 | 1080 | 0 | 0 |
| Oberto | | | | | 650 | | 0 | 1080 |
| Traviata | | | | | | | 1080 | |
| Lecithin | 25 | 24 | 25 | 25 | 24 | 25 | 25 | 25 |
| Vanilla | 1 | 1 | 1 | 1 | 1 | 1 | 1 | 1 |
| Total (g) | 4350 | 4350 | 5000 | 5000 | 5000 | 5000 | 5000 | 5000 |

The following process was used for preparing white chocolate and edible chocolate product 1:
Melt the cocoa butter at 45° C.
Mix the sugar, the sourdough if present in the composition, the milk powder, and part of the cocoa butter (in an amount to obtain between 27 and 29% total fat in the mix), in a Stephan mixer with double-jacketed walls at 45° C. for 15 minutes;
Refine the mixture on a 3-rolls refiner until a particle size of 20 μm is achieved;
Before filling the conche with the refined mixture, pour into the conche 10 to 20% of the total lecithin and about 2 to 10% of the total cocoa butter;
Fill the conche with the refined mixture and conche at 55° C. for 3 h with a motor speed of 375 RPM;
Liquefy the chocolate by adding the remaining lecithin, the remaining cocoa butter and all the vanilla;
Temper the chocolate using the following scheme: 45° C.-26° C.-30° C.;
Pour in moulds and cool for 15 minutes at 4-6° C., then at 15° C.

The following process was used for preparing dark chocolate and edible chocolate product 2
Melt the cocoa mass and the cocoa butter at 45° C.
Mix the sugar, the sourdough if present in the composition, the cocoa mass and part of the cocoa butter (in an amount to obtain between 27 and 29% total fat), in a Stephan mixer with double-jacketed walls at 45° C. for 15 minutes;
Refine the mixture on a 3-rolls refiner until a particle size of 20 μm is achieved;
Before filling the conche with the refined mixture, pour into the conche 10 to 15% of the total lecithin and about 10% of the total cocoa butter;
Fill the conche with the refined mixture and conche at 90° C. for 6 h with a motor speed of 750 RPM;
Liquefy the chocolate by adding the remaining lecithin, the remaining cocoa butter and all the vanilla;
Temper the chocolate using the following scheme: 45° C.-28° C.-32° C.;
Pour in moulds and cool 15 minutes at 4-6° C., then 1 h at 15° C.

The following process was used for preparing milk chocolate and edible chocolate products 3, 4 and 5:
Melt the cocoa mass and the cocoa butter at 45° C.
Mix the sugar, the sourdough if present in the composition, the milk powder, the cocoa mass and about 70% of the cocoa butter in a Stephan mixer with double-jacketed walls at 45° C. for 15 minutes;
Refine the mixture on a 3-rolls refiner until a particle size of 20 μm is achieved;
Before filling the conche with the refined mixture, pour into the conche 10 to 20% of the total lecithin and about 5 to 10% of the total cocoa butter;
Fill the conche with the refined mixture and conche at 80° C. for 6 h with a motor speed of 750 RPM;
Liquefy the chocolate by adding the remaining lecithin, the remaining cocoa butter and all the vanilla;
Temper the chocolate using the following scheme: 45° C.-28° C.-30° C.;

TABLE 2

The weight in g of the ingredients of various edible chocolate products (6-12).

| g | 6 | 7 | 8 | 9 | 10 | 11 | 12 |
|---|---|---|---|---|---|---|---|
| White choc. | 1000 | 1000 | 1000 | | | | |
| Dark choc. | | | | 1000 | 1000 | 1000 | |
| Milk Choc. | | | | | | | 1000 |
| Tosca | 149 | | | 149 | | | |
| Oberto | | 149 | | | 149 | | |
| Traviata | | | 149 | | | 149 | 266 |

The following process was used for preparing the edible chocolate products listed in table 2:
Melt the dark or milk chocolate at 45° C. and the white chocolate at 40° C.;
Pour the melted chocolate into a double-jacketed Stephan mixer with temperature set at 45° C. or 40° C.;
Add the powdered sourdough
Mix at speed 3 for 15 minutes;
Temper the mixture according to the chocolate manufacturer's specification (45° C.-28° C.-32° C. for the dark chocolate, 45° C.-26° C.-31° C. for the milk chocolate, 40° C.-26° C.-28° C. for the white chocolate).
Pour in molds and cool according to the chocolate manufacturer's recommendations (15 minutes in a fridge at 4-6° C., then 1 h in a fridge at 15° C.).

All products have been evaluated by an expert panel trained to taste chocolate. The following parameters were considered: visual aspect, odour, fineness (in the mouth), and taste (description, complexity, intensity, after-taste). The results of the evaluation are presented in next.

White Chocolate:
Visual aspect: Yellowish-white, typical of white chocolate, homogeneous colour.
Odour: Milky-creamy chocolate nose.
Fineness (in the mouth): Smooth—typical for well manufactured chocolate.
Taste description: Well-balanced white chocolate. Creamy at the start, with balancing sweet, vanilla and cooked milk/cream notes all along. Typically milky finish with creamy aftertaste.
Taste complexity: Medium.
Taste intensity: Medium.
After-taste: Medium long and medium intense.

Edible Chocolate Product 1:
Visual aspect: Yellowish-white, typical of white chocolate, homogeneous colour. Slightly more creamy yellow compared to the reference white chocolate. Whiter and less yellow than edible chocolate product 6, without dots.
Odour: Creamy chocolate nose, with a touch of cereal/malty and a sour note when compared to the reference white chocolate. More freshly sour than 6.

Fineness (in the mouth): Smooth—typical for well manufactured chocolate and not different than the reference white Chocolate.

Taste description: Creamy white chocolate taste at the start, body alternating with layers of cereal/malt notes and a fruity sour note, creamy final with a very long aftertaste combining malt and sour notes. All cereal/malt notes and fruity notes are absent from the reference white chocolate Taste complexity: Very—much more complex than the reference white chocolate and 6.

Taste intensity: Very—much more intense than the reference white chocolate and 6.

After-taste: Long and intense, longer than the reference white chocolate.

Edible Chocolate Product 6:
  Visual aspect: Yellowish-white, typical of white chocolate, with clear golden brown dots. Clearly more yellow than the reference white chocolate and with a less homogenous colour (presence of dots). More yellow and less homogenous than 1.
  Odour: Creamy nose of the reference white chocolate with a distinct malted and nutty flavour.
  Fineness (in the mouth): Coarse, granular sensation in the mouth.
  Taste description: Compared with the reference white chocolate, has a sweeter attack with parallel notes of milk and malted/roasted in the body, the latter being absent in the reference. Fruity-sour aftertaste absent from the reference white chocolate.
  Taste complexity: Medium—more complex than the reference white chocolate, less complex than 1.
  Taste intensity: Medium—more intense than the reference white chocolate, less intense than 1.
  After-taste: Long lasting creamy mouthfeel with a clear cereal aftertaste absent from the reference white chocolate.

Edible Chocolate Product 7:
  Visual aspect: Whitish-grey colour, with clear dark brown dots. Clearly more grey than the reference white chocolate and with a less homogenous colour (presence of dots).
  Odour: Creamy nose of the reference white chocolate contrasting with malty and roasted notes.
  Fineness (in the mouth): Coarse, granular sensation in the mouth.
  Taste description: Compared with the reference white chocolate, has a sweeter and equally creamy start, with a chocolate body contrasting with a roasted cereal flavour, the latter being absent in the reference. Aftertaste of roasted grains absent from the reference white chocolate.
  Taste complexity: Medium—more complex than the reference white chocolate.
  Taste intensity: Medium—more intense than the reference white chocolate.
  After-taste: Medium lasting creamy mouthfeel contrasting with a roasted aftertaste absent from the reference white chocolate.

Edible Chocolate Product 8:
  Visual aspect: Yellowish-white, typical of white chocolate, with clear golden brown dots.
  Odour: Creamy nose of the reference white chocolate balanced by sour and fruity flavours.
  Fineness (in the mouth): Coarse, granular sensation in the mouth.
  Taste description: Sweet start, with milky notes of the reference white chocolate. Contrasting fruity and malt notes, finishing with roasted notes and a short chocolate taste.
  Taste complexity: Medium—more complex than the reference white chocolate.
  Taste intensity: Medium—more intense than the reference white chocolate.
  After-taste: Medium lasting creamy aftertaste with acid and fruity notes absent from the reference.

Dark Chocolate:
  Visual aspect: Dark red/brown, typical for dark chocolate, homogeneous colour.
  Odour: nose of roasted cocoa.
  Fineness (in the mouth): Smooth—typical for well manufactured chocolate.
  Taste description: Well-balanced dark chocolate. Roasted notes at the start, with balancing cocoa and sweet and lightly fruity notes in the body, smooth.
  Taste complexity: Medium.
  Taste intensity: Medium.
  After-taste: Medium long and medium intense.

Edible Chocolate Product 2:
  Visual aspect: Dark red/brown, typical for dark chocolate, homogeneous colour. More homogenous than 10.
  Odour: Compared to the reference dark chocolate, has clearly more roasted and stronger cocoa notes. More complex nose than 10.
  Fineness (in the mouth): smooth—typical for well manufactured chocolate and not different than the reference dark chocolate.
  Taste description: Roasted start, body alternating strong chocolaty and malty flavours with a peak of sour freshness, finish with a strong roasted note, with a very long aftertaste of strong roasted and hints of sour notes blending in the cocoa taste. Compared to the reference dark chocolate, it is a very harmonious blend of the intrinsic taste of the chocolate and the flavour notes of the co-processed sourdough.
  Taste complexity: Very—much more complex than the reference dark chocolate and sample 10.
  Taste intensity: Very—much more intense than the reference dark chocolate and 10.
  After-taste: Long and intense, longer and more intense than the reference dark chocolate Edible Chocolate Product 9:
  Visual aspect: Dark red/brown, typical for dark chocolate, not completely homogeneous.
  Odour: Balanced chocolate nose, with a distinct creamy and malty flavour absent from the reference.
  Fineness (in the mouth): Coarse, granular sensation in the mouth.
  Taste description: Roasted cocoa notes to start, absent from the reference, with a parallel sensation of balanced chocolate and cereal notes in the body. Cereal aftertaste. All cereal notes are absent from the reference dark chocolate.
  Taste complexity: Medium—more complex than dark chocolate.
  Taste intensity: Medium—more intense than dark chocolate.
  After-taste: Medium lasting chocolate aftertaste with clear cereal flavour in the end absent from the reference dark chocolate.

Edible Chocolate Product 10:
  Visual aspect: Dark red/brown, typical for dark chocolate, not completely homogeneous. Less homogenous than 2.
  Odour: Balanced chocolate nose topped with clear sweet-roasted notes absent from the reference dark chocolate. Nose is less complex than 2.
  Fineness (in the mouth): Coarse, granular sensation in the mouth.
  Taste description: Roasted cocoa/chocolate notes, then a malty and roasted peak, finishing with roasted and chocolate notes. Compared with the reference dark chocolate, the more intense roasted notes and the malty notes are different and not blending into the intrinsic chocolate taste.
  Taste complexity: medium—more complex than dark chocolate, less complex than 2.
  Taste intensity: medium—more intense than dark chocolate, less intense than 2.
  After-taste: medium lasting roasted aftertaste, absent from the reference dark chocolate.
Edible chocolate product 11:
  Visual aspect: Dark red/brown, typical for dark chocolate, not completely homogeneous.
  Odour: Balanced chocolate nose with clear fruity raisins notes absent from the reference dark chocolate.
  Fineness (in the mouth): Coarse, granular sensation in the mouth.
  Taste description: Roasted cocoa/chocolate notes at the start, followed by a clear fruity and sour peak, finishing with roasted chocolate notes. Compared with the reference dark chocolate, the more intense roasted notes and the fruity and sour notes are different and not blending into the intrinsic chocolate taste.
  Taste complexity: Medium—more complex than dark chocolate.
  Taste intensity: Medium—more intense than dark chocolate.
  After-taste: Medium lasting aftertaste of chocolate with acid fruity tastes absent from the reference dark chocolate.
Milk Chocolate:
  Visual aspect: Medium—light brown with golden hue.
  Odour: Balanced note of cocoa and caramel/sweet
  Fineness (in the mouth): smooth—typical for well manufactured chocolate
  Taste description: Well-balanced milk chocolate. Sweet start, followed by a cooked milk, then cocoa body. Creamy and milky finish, with a balanced aftertaste of cocoa and milk.
  Taste complexity: Medium.
  Taste intensity: Medium.
  After-taste: Medium long and medium intense.
Edible Chocolate Product 3:
  Visual aspect: Medium—light brown with golden hue absent from the reference milk chocolate. Lighter than 4 and 5.
  Odour: Chocolate nose with a hint of sour fruitiness and some cereal notes absent from the reference milk chocolate.
  Fineness (in the mouth): smooth—typical for well manufactured chocolate
  Taste description: Cocoa start with directly a fresh and fruity acidity followed by a sweet malty peak. Creamy full chocolate body combined with cereal and fruit notes, with a long lasting aftertaste of cereals. Compared with the reference milk chocolate, this product has no milky notes, and combines harmoniously the creamy and cocoa flavours of the chocolate with the typical notes of the co-processed sourdough.
  Taste complexity: High—much more complex than the reference milk chocolate.
  Taste intensity: High—much more intense than the reference milk chocolate.
  After-taste: Medium long and more intense than the reference milk chocolate.
Edible Chocolate Product 4:
  Visual aspect: Medium—dark brown chocolate colour, clearly darker than the reference milk chocolate, 3 and 5.
  Odour: Chocolate nose with strong roasted cereal notes and hints of fruity sourness absent from the reference milk chocolate.
  Fineness (in the mouth): Smooth—typical for well manufactured chocolate.
  Taste description: Chocolate taste with alternating notes of fresh fruit and malt in the body. Finish with clear peak of roasted flavours, providing a smooth roasted chocolate aftertaste. Compared with the reference milk chocolate, this product has no milky notes, and combines harmoniously the creamy and cocoa flavours of the chocolate with the typical notes of the co-processed sourdough.
  Taste complexity: High, much more complex than the reference milk chocolate.
  Taste intensity: Very—much more intense than the reference milk chocolate.
  After-taste: Longer and more intense than the reference milk chocolate.
Edible Chocolate Product 5:
  Visual aspect: Medium brown, with light golden hues. Intermediary between 3 and 4, darker and more golden than the reference milk chocolate.
  Odour: Mild raisins nose absent from the reference milk chocolate, with sweet cocoa notes.
  Fineness (in the mouth): Smooth—typical for well manufactured chocolate.
  Taste description: Combination of chocolate and fruit at the start, continuing with light cereal notes. Finish with peaks of malty flavours, and aftertaste combining cocoa, freshness of the fruits and lingering cereal taste. Compared with the reference milk chocolate, this product has no milky notes, and combines harmoniously the creamy and cocoa flavours of the chocolate with the typical notes of the co-processed sourdough.
  Taste complexity: High, much more complex than the reference milk chocolate.
  Taste intensity: High, much more intense than the reference milk chocolate.
  After-taste: Medium long and more intense than the reference milk chocolate.
Edible Chocolate Product 12:
  Visual aspect: Medium—light brown colour typical of milk chocolate, with clear darker dots.
  Less homogenous than the reference milk chocolate.
  Odour: Sweet and light cocoa nose, with a hint of sourness and raisins absent from the reference milk chocolate.
  Fineness (in the mouth): Coarse, granular sensation in the mouth.
  Taste description: Sweet and milky chocolate taste in the start, with a clear peak of fruity sourness, followed by a peak of roasted flavour. Sweet finish, with a sour aftertaste. Compared with the reference milk chocolate, this product presents 2 separate taste profiles, and does not combine the intrinsic chocolate taste with the taste of the added sourdough. Its perception is also sweeter than the reference milk chocolate.

Taste complexity: Medium—more complex than the reference milk chocolate.

Taste intensity: Medium—more intense than the reference milk chocolate.

After-taste: Medium—lasting aftertaste of sweet and caramel with acid fruity tastes absent from the reference milk chocolate.

Example 2

In a second example, a chocolate cake is discussed which was made using a chocolate cake batter comprising an edible chocolate product as disclosed herein. The ingredients which were used are listed below in table 3.

TABLE 3

Ingredients used for manufacturing the present chocolate cake.

| Ingredients (w/w %) | | Ingredients (w/w %) | |
|---|---|---|---|
| Flour | 21 | Whey powder | 1.3 |
| Eggs | 18.6 | Baking powder | 0.7 |
| Sugar | 18.4 | Emulsifier | 0.5 |
| Edible chocolate product 2 of example 1 | 16 | Water | Up to 100% |
| Rapeseed oil | 11.5 | | |

All ingredients are weighed into a mixing bowl starting with the liquid ingredients: water, pasteurised eggs and oil. All ingredients are first manually mixed with a spatula and subsequently mixed with a planetary mixer (Hobart type N50) for 2 minutes at speed 1 and 2 minutes at speed 2. Portions of 300 g of batter are weighed into aluminium baking tin, placed on a baking tray and baked in a deck oven (MIWE Condo) at 180° C. for 45 minutes. After baking, the cakes (in the tins) are cooled on a rack for two hours at room temperature).

The cakes showed the following properties:

Texture/volume: surprisingly, the use of edible chocolate product according to the invention had no negative impact on the volume. The texture was moister than the texture of a regular chocolate cake containing "classical" chocolate.

Taste: several aspects of the taste were impacted by the use of sourdough-containing chocolate:

The complexity of the taste is greater than the taste of a regular chocolate cake containing "classical" chocolate. Roasted and malty notes were clearly noticeable in the end, and the taste of chocolate was very clear and present all along;

The intensity of the taste is higher than the intensity of the taste of a regular chocolate cake containing "classical" chocolate.

The aftertaste is a combination of roasted, malty and cocoa tastes and is surprisingly long lasting.

Example 3: Edible Chocolate Product with Buckwheat Sourdough

The ingredients of the edible chocolate product and their respective amounts are listed in table 4.

TABLE 4

| g | 13 |
|---|---|
| Sugar | 395 |
| Cocoa mass | 412 |
| Cocoa butter | 88.4 |
| Fermented buckwheat 80 (Böcker, Germany) | 100 |
| Lecithin | 4.4 |
| Vanilla | 0.2 |

The following process was used for preparing edible chocolate product 13:

Melt the cocoa mass and cocoa butter at 45° C.

Mix the sugar, the sourdough, the cocoa mass and 65 g of cocoa butter in a Stephan mixer with double-jacketed walls at 45° C. for 15 minutes;

Refine the mixture on a 3-rolls refiner until a particle size of 20 µm is achieved;

Before filling the conche with the refined mixture, pour into the conche 10 to 15% of the total lecithin and about 10% of the total cocoa butter;

Fill the conche with the refined mixture and conche at 90° C. for 6 h with a motor speed of 750 RPM;

Liquefy the chocolate by adding the remaining lecithin, the remaining cocoa butter and all the vanilla;

Temper the chocolate using the following scheme: 45° C.-28° C.-32° C.;

Pour in moulds and cool 15 minutes at 4-6° C., then 1 h at 15° C.

The product 13 has been evaluated and compared to the dark chocolate of example 1 by an expert panel trained to taste chocolate. The following parameters were considered: visual aspect, odour, fineness (in the mouth), and taste (description, complexity, intensity, after-taste). The results of the evaluation are presented in the following paragraph:

Visual aspect: Dark red/brown, typical for dark chocolate, homogeneous colour.

Odour: Compared to the reference dark chocolate, has clearly more acidic, fruity notes Fineness (in the mouth): Smooth—typical for well manufactured chocolate and not different than the reference dark chocolate Taste description: Cocoa notes at the start, body alternating layer of fruity, acidic notes Taste complexity: Vey much complex than the reference dark chocolate Taste intensity: Very much more intense than the reference dark chocolate After-taste: Medium long and medium intense.

Example 4: Edible Chocolate Product with Quinoa Sourdough

The ingredients of the edible chocolate product and their respective amounts are listed in table 5.

TABLE 5

| g | 14 |
|---|---|
| Sugar | 446 |
| Cocoa butter | 298 |

TABLE 5-continued

| | |
|---|---|
| g | 14 |
| Whole milk powder | 153 |
| Fermented quinoa (Böcker, Germany) | 97.8 |
| Lecithin | 5 |
| Vanilla | 0.2 |

The following process was used for preparing edible chocolate product 13:

Melt the cocoa butter at 45° C.

Mix the sugar, the sourdough, the milk powder, and 260 g of cocoa butter in a Stephan mixer with a double-jacketed walls at 45° C. for 15 minutes Refine the mixture on 3 rolls refiner until a particle size of 20 μm is achieved Before filling the conche, pour into the conche 10 to 20% of the total lecithin end about 2 to 10% of the cocoa butter Fill the conche with the refined mixture and conche at 55° C. for 3 h with a motor speed of 375 RPM Liquefy the chocolate by adding the remaining lecithin, the remaining cocoa butter and all the vanilla Temper the chocolate using the following scheme: 45° C.-26° C.-30° C.

Pour in moulds and cool for 15 minutes at 4-6° C., then at 15° C.

The product 14 has been evaluated and compared to the white chocolate of example 1 by an expert panel trained to taste chocolate. The following parameters were considered: visual aspect, odour, fineness (in the mouth), and taste (description, complexity, intensity, after-taste). The results of the evaluation are presented in the following paragraph:

Visual aspect: Yellowish-white, typical of white chocolate, homogeneous colour. Slightly more creamy yellow compare to the reference Odour: creamy chocolate nose with a touch of cereal, floral note Fineness (in the mouth): smooth—typical for well manufactured chocolate and not different that the reference white chocolate Taste description: well-balanced white chocolate, creamy at the start, body alternating with layers of cereal, flora, fruity and fermented (cheese) notes. All those notes are absent from the reference white chocolate.

Taste complexity: Very—much more complex than the reference white chocolate.

The invention claimed is:

1. An edible chocolate product comprising a homogeneous mixture of
   between 50.0 and 99.0% (w/w) chocolate; and
   between 1.0 and 50.0% (w/w) of a dry powdered fermented plant product, wherein said dry powdered fermented plant product is a flour derived from fermented cereals, pseudo-cereals, fractions of cereals, fractions of pseudo-cereals, or combinations thereof, and wherein said dry powdered fermented plant product is non-baked;
   wherein the edible chocolate product has a granulometry below 30.0 μm.

2. The edible chocolate product according to claim 1 wherein the sum of said chocolate content and said dry powdered fermented plant product content is higher than 80% (w/w).

3. The edible chocolate product according to claim 1 having a dry matter content higher than 80%.

4. The edible chocolate product according to claim 1 wherein said chocolate is a refined and/or conched chocolate.

5. The edible chocolate product according to claim 1 wherein said dry powdered fermented plant product is a sourdough product.

6. A method for preparing an edible chocolate product according to claim 1 comprising the steps:
   a1) mixing a dry powdered fermented plant product and molten chocolate into a homogeneous mixture, thereby obtaining a chocolate-fermented plant product mixture; or,
   a2) melting chocolate ingredients including cocoa mass, fat, and optionally one or more further ingredients, thereby obtaining molten chocolate ingredients; and further mixing the molten chocolate ingredients with a dry powdered fermented plant product into a homogeneous mixture, thereby obtaining a chocolate ingredients-fermented plant product mixture;
   wherein said dry powdered fermented plant product is a flour derived from fermented cereals, pseudo-cereals, fractions of cereals, fractions of pseudo-cereals, or combinations thereof, and wherein said dry powdered fermented plant product is non-baked; and
   b) further processing the chocolate-fermented plant product mixture or the chocolate ingredients-fermented plant product mixture into an edible chocolate product;
   wherein the edible chocolate product has a granulometry below 30.0 μm.

7. The method according to claim 6 wherein the step of further processing the chocolate-fermented plant product mixture into an edible chocolate product comprises the steps of:
   1) tempering the chocolate-fermented plant product mixture, thereby obtaining a tempered mixture; and,
   2) cooling the tempered mixture.

8. The method according to claim 6 wherein the step of further processing the cocoa butter-fermented plant product mixture into an edible chocolate product comprises the steps of:
   1) refining the cocoa butter-fermented plant product mixture, thereby obtaining a refined mixture;
   2) optionally conching the refined mixture, thereby obtaining a conched mixture;
   3) adding further ingredients to the refined or conched mixture, thereby liquefying the refined or conched mixture, thus obtaining a liquefied mixture;
   4) tempering the liquefied mixture, thereby obtaining tempered chocolate.

9. The method according to claim 8 wherein the refining process of step b3) is executed until a particle size below 30 μm is achieved.

10. The method according to claim 8 wherein the conching process of step (2) is done for 3 h to 6 h at 55° C. to 90° C.; and/or at a motor speed of 375 rpm to 750 rpm.

11. The method according to claim 6 wherein said further ingredients may comprise sugar, all or part of the cocoa mass, other solid ingredients optionally selected from the group consisting of milk powders and/or substitutes thereof, flavors and emulsifiers.

12. The method according to claim 6 wherein steps a1) and a2) are performed at a temperature between 40.0° C. and 50.0° C.

13. Use of a dry powdered fermented plant product for producing an edible non-baked chocolate product according to claim 1, the dry powdered fermented plant product being a flour derived from fermented cereals, pseudo-cereals, fractions of cereals, fractions of pseudo-cereals, or combinations thereof.

14. The use according to claim 13 wherein the dry powdered fermented plant product is a sourdough product.

15. The edible chocolate product according to claim 1 comprising between 5.0 and 15.0% (w/w) of a dry powdered fermented plant product.

16. The edible chocolate product according to claim 1 wherein the sum of said chocolate content and said dry powdered fermented plant product content is higher than 90% (w/w).

17. The edible chocolate product according to claim 1 wherein the sum of said chocolate content and said dry powdered fermented plant product content is higher than 95% (w/w).

18. The edible chocolate product according to claim 1 wherein said dry powdered fermented plant product is dry sourdough.

19. Use of a dry powdered fermented plant product as a complete or partial replacer for one or more ingredients in a chocolate recipe, wherein said ingredients are chosen from sugar, milk and/or milk powder.

20. The use according to claim 19 wherein said dry powdered fermented plant product replaces all the milk and/or the milk powder in a chocolate recipe.

* * * * *